(12) United States Patent
Lin (10) Patent No.: US 10,037,453 B2
(45) Date of Patent: Jul. 31, 2018

(54) CAPACITIVE FINGERPRINT SENSING MODULE

(71) Applicant: Wu-Hsu Lin, Taichung (TW)

(72) Inventor: Wu-Hsu Lin, Taichung (TW)

( * ) Notice: Subject to any disclaimer, the term of this patent is extended or adjusted under 35 U.S.C. 154(b) by 167 days.

(21) Appl. No.: 15/248,586

(22) Filed: Aug. 26, 2016

(65) Prior Publication Data

US 2018/0060633 A1    Mar. 1, 2018

(51) Int. Cl.
*G06K 9/00* (2006.01)

(52) U.S. Cl.
CPC ....... *G06K 9/0002* (2013.01); *G06K 9/00006* (2013.01); *G06K 9/00053* (2013.01)

(58) Field of Classification Search
CPC ............. G06K 9/0002; G06K 9/00053; G06K 9/0004; G06K 9/00006
See application file for complete search history.

(56) References Cited

U.S. PATENT DOCUMENTS

| | | | | |
|---|---|---|---|---|
| 7,030,860 | B1 * | 4/2006 | Hsu | G06F 3/044 178/18.06 |
| 7,545,649 | B2 * | 6/2009 | Tan | H05K 1/028 174/254 |
| 2012/0092350 | A1 * | 4/2012 | Ganapathi | G02B 26/0833 345/501 |
| 2014/0333328 | A1 * | 11/2014 | Nelson | G06F 3/044 324/663 |
| 2015/0177884 | A1 * | 6/2015 | Han | G06F 3/044 345/174 |
| 2015/0241393 | A1 * | 8/2015 | Ganti | G01N 29/09 73/589 |
| 2015/0294135 | A1 * | 10/2015 | Kim | H01L 23/04 382/124 |
| 2017/0048977 | A1 * | 2/2017 | Siddique | H05K 3/323 |
| 2017/0076130 | A1 * | 3/2017 | Kravets | G06K 9/0008 |

* cited by examiner

*Primary Examiner* — Utpal Shah
(74) *Attorney, Agent, or Firm* — Lerner, David, Littenberg, Krumholz & Mentlik, LLP (57) ABSTRACT

A capacitive fingerprint sensing module includes a flexible printed circuit board, a lower conductive adhesive layer, an upper conductive adhesive layer, and a positioning frame. The flexible printed circuit board has an upper surface and a lower surface. The upper surface has a finger pressing region and a first sensing layer. The lower surface has a second sensing layer. The lower conductive adhesive layer is formed on the second sensing layer and provided to cover second sensing electrodes mounted on the second sensing layer. The upper conductive adhesive layer is formed on the finger pressing region. The positioning frame has an opening facing upward and a slot. The flexible printed circuit board is inserted through the slot and embedded in the positioning frame. Accordingly, effects of conductivity enhancement and accuracy improvement of the capacitive fingerprint sensing module are produced.

10 Claims, 7 Drawing Sheets

CAPACITIVE FINGERPRINT SENSING MODULE

BACKGROUND OF THE INVENTION

1. Technical Field

The present disclosure relates generally to a fingerprint sensing module, and more particularly to a capacitive fingerprint sensing module with package structure of conductive adhesive layers.

2. Description of Related Art

Due to technology developments and user requirements, capacitive touch technology has been widely used in electronic products. For fingerprint identifications, the capacitive touch technology is used to collect fingerprint information by small and thin capacitive sensors. Further, fingerprint feature points of the collected fingerprint information are compared to verify the authenticity of the user's identity. The capacitive fingerprint identification technology is gradually applied to enhance the user's data security, such as USBs, notebook computers, mobile phones, credit cards, passports, identification cards, or so on.

Since the accuracy of sensing capacitance values is dependent on the accuracy of fingerprint feature points of the fingerprint information collected, the higher accuracy of sensing capacitance values by conductivity enhancement is crucial for persons of ordinary skill in the art.

BRIEF SUMMARY OF THE INVENTION

An objective of the present disclosure is to provide a capacitive fingerprint sensing module to produce effects of conductivity enhancement and accuracy improvement of the capacitive fingerprint sensing module.

In order to achieve the above-mentioned objective, the capacitive fingerprint sensing module includes a flexible printed circuit board, a lower conductive adhesive layer, an upper conductive adhesive layer, and a positioning frame. The flexible printed circuit board has an upper surface and a lower surface. The upper surface has a finger pressing region and a first sensing layer corresponding in position to the finger pressing region, wherein a plurality of first sensing electrodes are mounted on the first sensing layer. The lower surface has a second sensing layer corresponding in position to the finger pressing region, wherein a plurality of second sensing electrodes are mounted on the second sensing layer. The lower conductive adhesive layer is formed on the second sensing layer of the flexible printed circuit board and configured to cover the second sensing electrodes. The upper conductive adhesive layer is formed on the finger pressing region. The positioning frame has an opening facing upward and a slot formed in a side wall of the positioning frame and communicating with the opening. The flexible printed circuit board is inserted through the slot and embedded in the positioning frame, and the finger pressing region of the upper surface is corresponding in position to and exposed at the opening of the positioning frame.

Accordingly, the lower conductive adhesive layer is used to produce effects of conductivity enhancement of the sensing electrodes and accuracy improvement of the capacitive fingerprint sensing module.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF THE DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Reference will now be made to the drawing figures to describe the present disclosure in detail.

Figure 1:
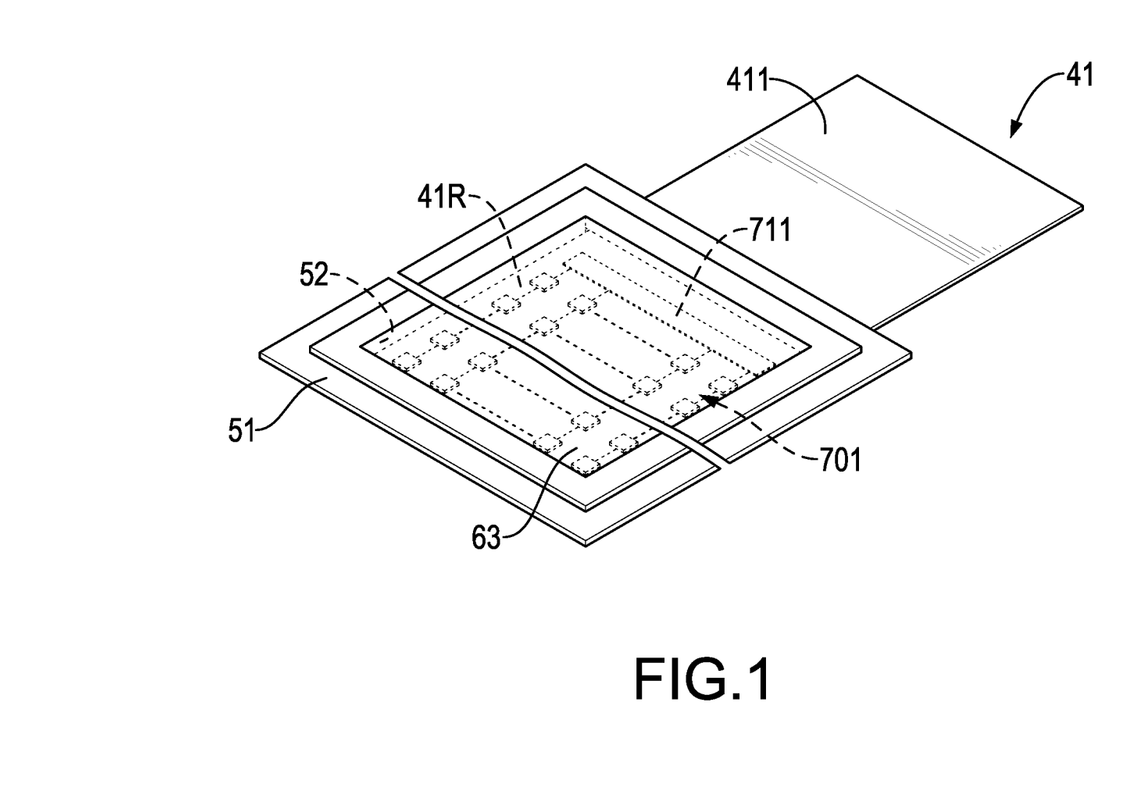
FIG. 1 is a schematic perspective external top view of a capacitive fingerprint sensing module according to the present disclosure.
Figure 2:
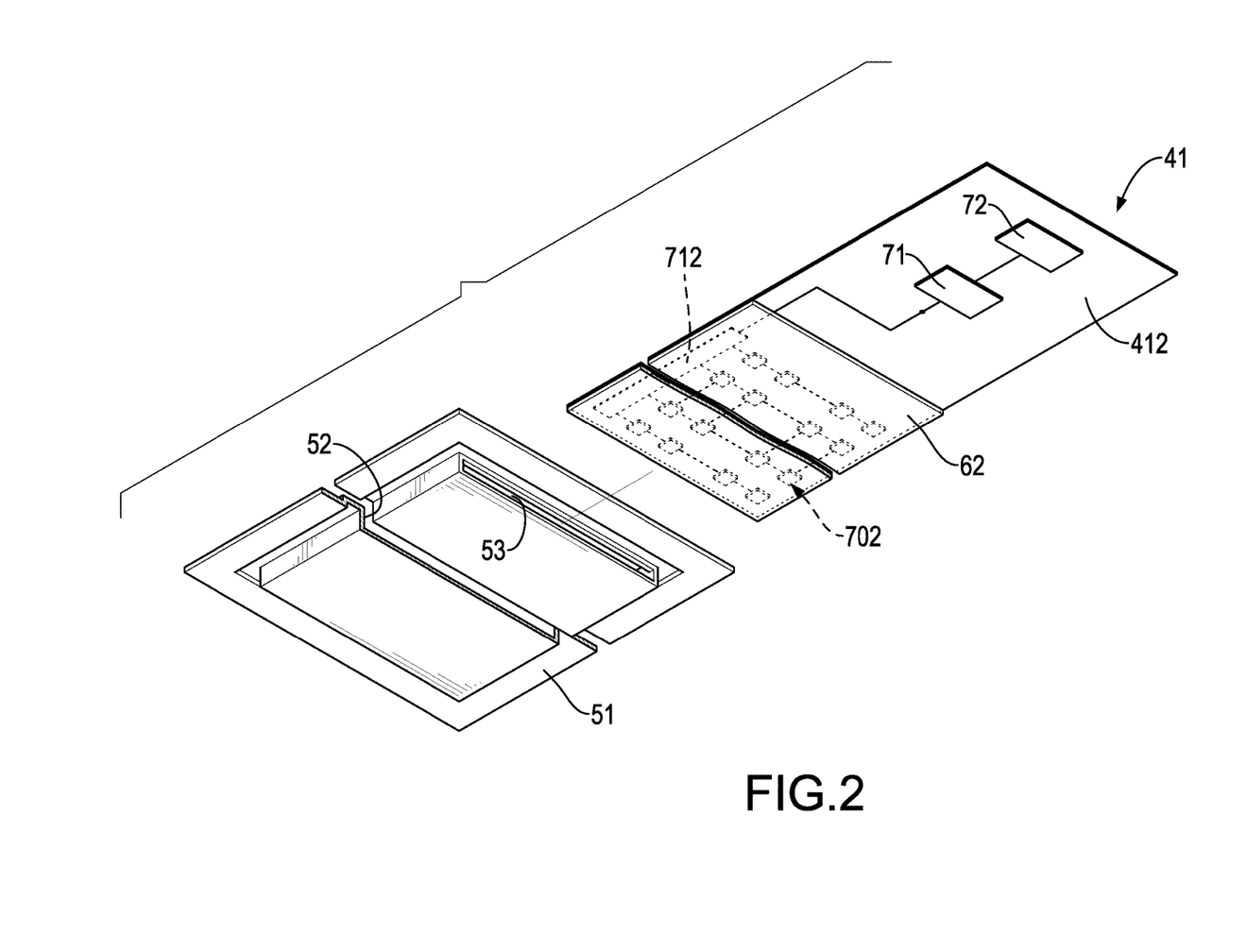
FIG. 2 is a schematic perspective exploded bottom view of the capacitive fingerprint sensing module according to the present disclosure.

As shown in FIG. 1 and FIG. 2, the capacitive fingerprint sensing module includes a flexible printed circuit board 41, a lower conductive adhesive layer 62, and a positioning frame 51.

Figure 3A:
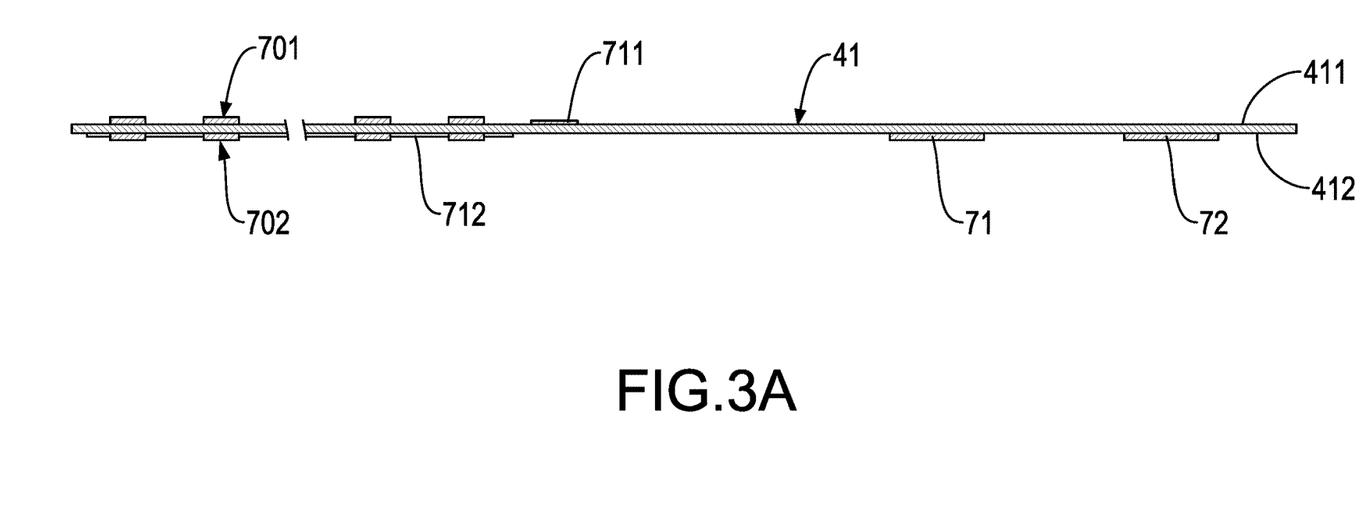
FIG. 3A is a schematic plan side view of a flexible printed circuit board of the capacitive fingerprint sensing module according to the present disclosure.

In this present disclosure, the flexible printed circuit board 41 is a double-side flexible printed circuit board (double-side FPCB). The flexible printed circuit board 41 has an upper surface 411 and a lower surface 412. A finger pressing region 41R is defined on the upper surface 411, which is a valid pressing region for the user's finger. As shown in FIG. 3A, the capacitive fingerprint sensing module further includes a control unit 71, such as a chip. In this embodiment, the control unit 71 is, but not limited to, mounted on the lower surface 412 of the flexible printed circuit board 41. Alternatively, the control unit 71 may be mounted on the upper surface 411 of the flexible printed circuit board 41.

Figure 3B:
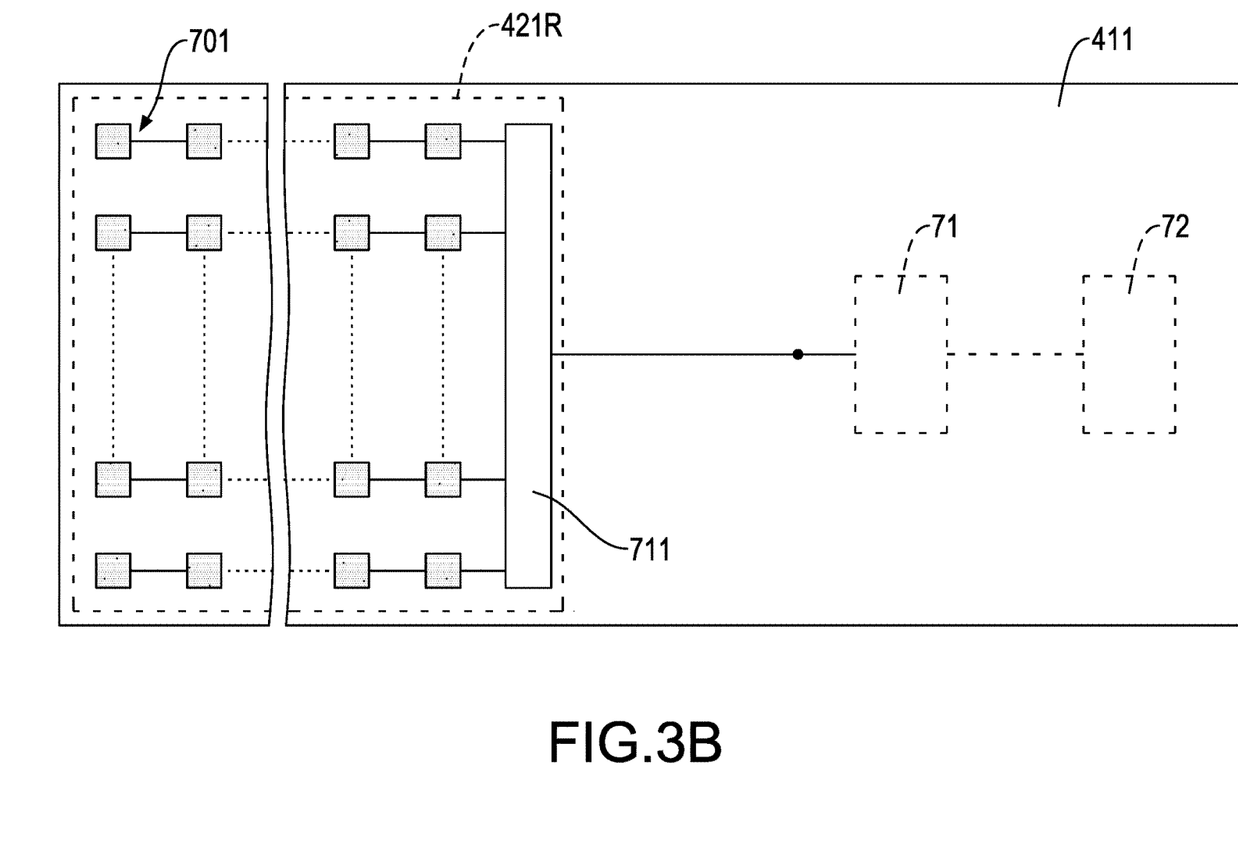
FIG. 3B is a schematic plan top view of the flexible printed circuit board of the capacitive fingerprint sensing module according to the present disclosure.

In addition, as shown in FIG. 3B, a first sensing layer 421R, corresponding in position to the finger pressing region 41R of the upper surface 411, is defined on the upper surface 411. Also, the finger pressing region 41R is corresponding in position to the first sensing layer 421R.

Figure 3C:
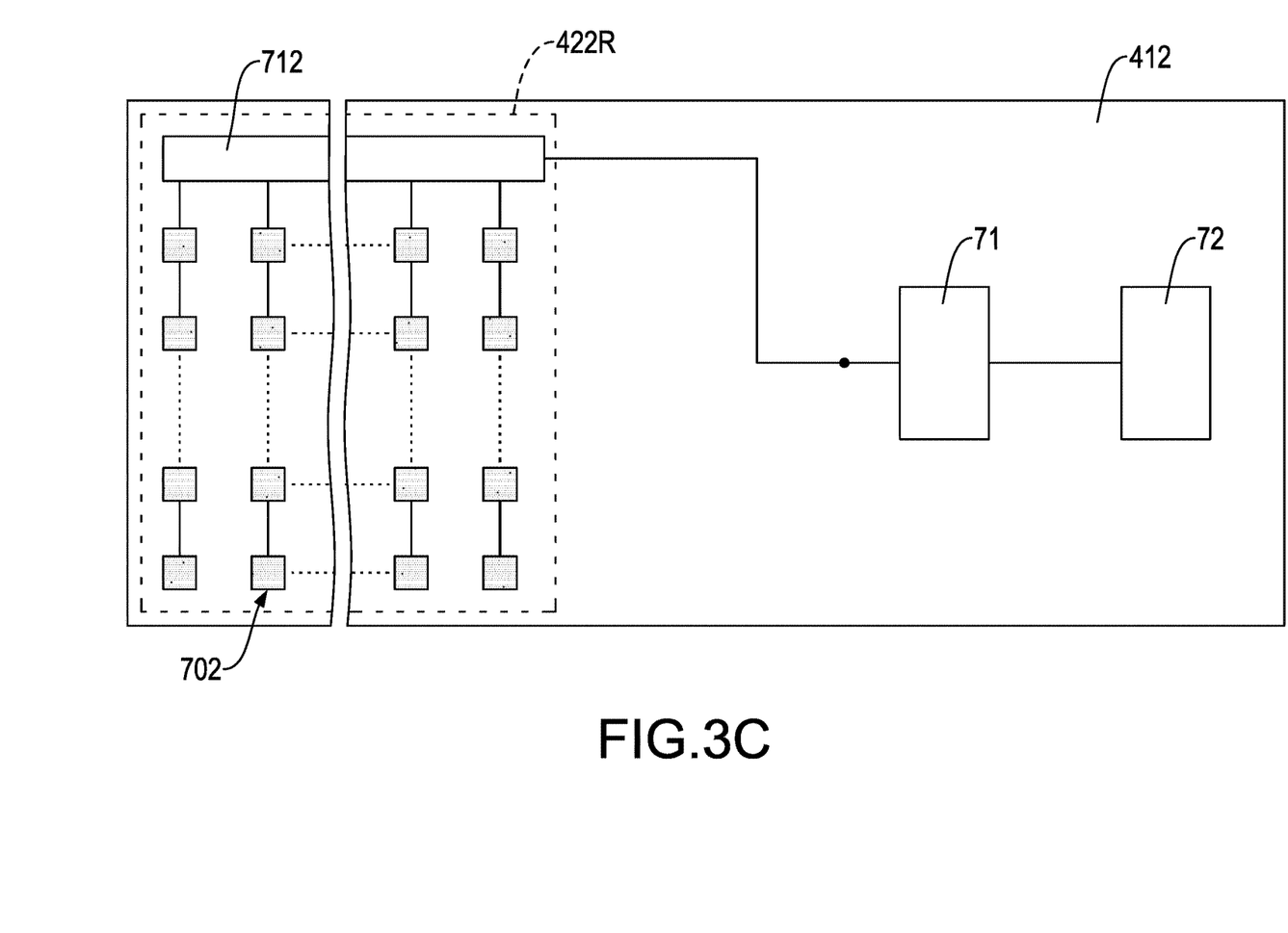
FIG. 3C is a schematic plan bottom view of the flexible printed circuit board of the capacitive fingerprint sensing module according to the present disclosure.

As shown in FIG. 3C, the lower surface 412 has a second sensing layer 422R corresponding in position to the finger pressing region 41R of the upper surface 411. Also, the finger pressing region 41R is corresponding in position to the second sensing layer 422R.

A plurality of first sensing electrodes 701 are mounted on the first sensing layer 421R of the upper surface 411. The first sensing electrodes 701, also called row electrodes, are mounted on the first sensing layer 421R of the upper surface 411 in a multi-row manner. The first sensing electrodes 701 are electrically connected to a first data bus 711, and the first data bus 711 is provided to receive sensing capacitance values generated from the first sensing electrodes 701 as described in detail later.

A plurality of second sensing electrodes 702 are mounted on the second sensing layer 422R of the lower surface 412. The second sensing electrodes 702, also called column electrodes, are mounted on the second sensing layer 422R of the lower surface 412 in a multi-column manner. The second sensing electrodes 702 are electrically connected to a second data bus 712, and the second data bus 712 is provided to receive sensing capacitance values generated from the second sensing electrodes 702 as described in detail later.

In particular, the first sensing electrodes 701 are not limited to be the row electrodes and the second sensing electrodes 702 are not limited to be the column electrodes. In other words, the first sensing electrodes 701 can be arranged in the multi-column manner and the second sensing electrodes 702 can be arranged in the multi-row manner.

In addition, the lower conductive adhesive layer 62 is formed on the second sensing layer 422R of the lower surface 412 and provided to cover the second sensing electrodes 702. In particular, the lower conductive adhesive layer 62 is, but not limited to, an anisotropic conductive adhesive layer.

As shown in FIG. 1 and FIG. 2, the positioning frame 51 has a slot 53 and an opening 52 facing upward. The slot 53 is formed in a side wall of the positioning frame 51 and communicating with the opening 52.

The flexible printed circuit board 41 is inserted through the slot 53 and embedded in the positioning frame 51, and the finger pressing region 41R is exposed at the opening 52 of the positioning frame 51. A side edge of the flexible printed circuit board 41 is abutted against another side wall of the positioning frame 51 far away from the slot 53. Accordingly, the finger pressing region 41R of the upper surface 411 and the second sensing layer 422R of the lower surface 412 are disposed corresponding in position to the opening 52, and the finger pressing region 41R is exposed at the opening 52.

The lower conductive adhesive layer 62 is coated between a bottom of the opening 52 of the positioning frame 51 and the second sensing layer 422R of the flexible printed circuit board 41 so that the flexible printed circuit board 41 is adhered in the positioning frame 51. After being hardened, the lower conductive adhesive layer 62 provides effects of conductivity enhancement and bottom support of the flexible printed circuit board 41.

As shown in FIG. 3B and FIG. 3C, the control unit 71 is electrically connected to the first sensing electrodes 701 and the second sensing electrodes 702 via conductive traces formed on the flexible printed circuit board 41. Each of the first sensing electrodes 701 and each of the second sensing electrodes 702 receive a press sensing signal to correspondingly produce a sensing capacitance value, respectively. For example, the touched first sensing electrode(s) 701 and the touched second sensing electrode(s) 702 correspondingly produce sensing capacitance values when the user's finger touches on one or more than one first sensing electrodes 701 and one or more than one second sensing electrodes 702.

After receiving the sensing capacitance values through the first data bus 711 and the second data bus 712, the control unit 71 determines whether the first sensing electrodes 701 and the second sensing electrodes 702 are pressed or not according to the sensing capacitance values. The sensing capacitance values are varied with the press sensing signals received by the first sensing electrodes 701 and the second sensing electrodes 702 since the finger pressing region 41R of the upper surface 411 is or is not pressed, or the sensing capacitance values are varied with the location of the finger pressing region 41R where the finger presses. Accordingly, the control unit 71 determines whether the first sensing electrodes 701 and the second sensing electrodes 702 are pressed and the pressed location and pressed scope of the finger pressing region 41R according to the sensing capacitance values.

The capacitive fingerprint sensing module further includes an integrated circuit 72. The integrated circuit 72 is, but not limited to, mounted on the lower surface 412 of the flexible printed circuit board 41. Alternatively, the integrated circuit 72 can be mounted on the upper surface 411 of the flexible printed circuit board 41. The integrated circuit 72 is electrically connected to the control unit 71 via conductive traces on the flexible printed circuit board 41. The integrated circuit 72 receives information outputted from the control unit 71 according to conditions of the first sensing electrodes 701 and the second sensing electrodes 702. In one example, a fingerprint sensing integrated circuit is exemplified for the integrated circuit 72. The fingerprint sensing integrated circuit receives fingerprint information outputted from the control unit 71 according to conditions of the first sensing electrodes 701 and the second sensing electrodes 702 to analyze the fingerprint information and verify the authenticity of the user's identity.

Figure 4:
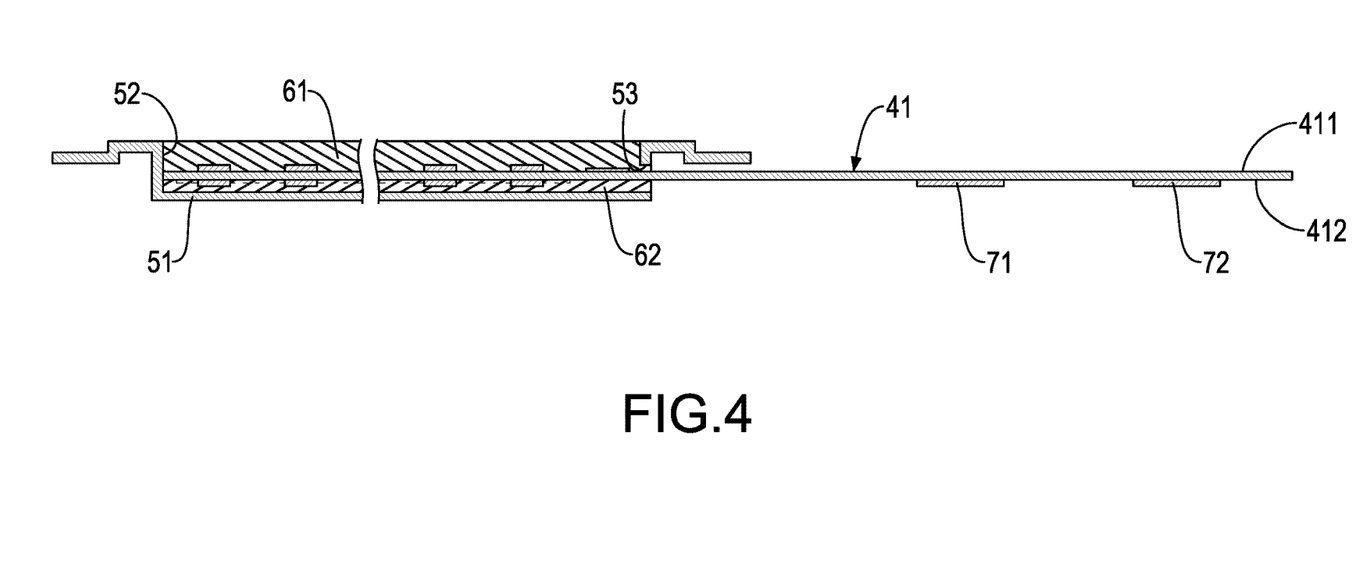
FIG. 4 is a schematic sectional view of the capacitive fingerprint sensing module according to a first embodiment of the present disclosure.

FIG. 4 shows a first embodiment of the capacitive fingerprint sensing module. In the first embodiment, the structure of the capacitive fingerprint sensing module is described previously. As shown in FIG. 3A, the lower conductive adhesive layer 62 is coated on the second sensing layer 422R of the lower surface 412 to cover the second sensing electrodes 702. The lower conductive adhesive layer 62 is provided to enhance conductivity of the second sensing electrodes 702 and improve accuracy of the capacitive fingerprint sensing module as well as support the flexible printed circuit board 41.

In addition, the flexible printed circuit board 41 further provides an upper conductive adhesive layer 61. The upper conductive adhesive layer 61 is coated on the finger pressing region 41R and the first sensing layer 421R of the upper surface 411 and corresponding in position to the opening 52 of the positioning frame 51. In this embodiment, a top surface of the upper conductive adhesive layer 61 is formed on the same plane with a top surface of the positioning frame 51. The upper conductive adhesive layer 61 is coated on the finger pressing region 41R of the upper surface 411 and also the lower conductive adhesive layer 62 is coated on the second sensing layer 422R of the lower surface 412. In particular, the upper conductive adhesive layer 61 can be a hard conductive adhesive layer or a soft conductive adhesive layer. Further, the upper conductive adhesive layer 61 can be, but not limited to, an anisotropic conductive adhesive layer. Both the upper conductive adhesive layer 61 and the lower conductive adhesive layer 62 are coated on the flexible printed circuit board 41 to enhance conductivity of the first sensing electrodes 701 and the second sensing electrodes 702 and improve accuracy of the capacitive fingerprint sensing module. Further, the upper conductive adhesive layer 61 provides a scratch-resistant function after being hardened.

Figure 5:
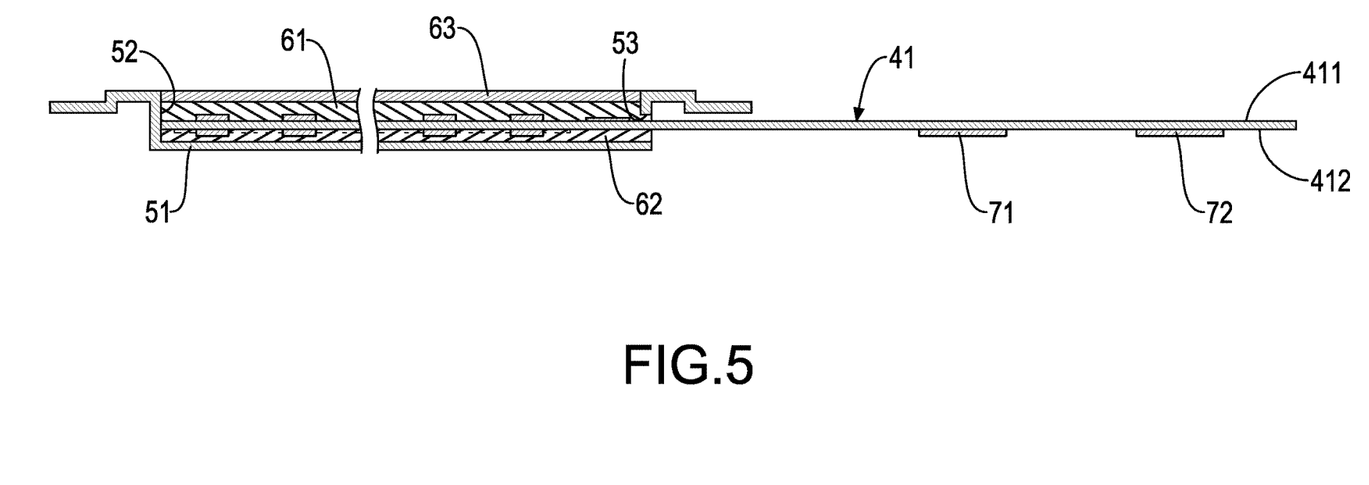
FIG. 5 is a schematic sectional view of the capacitive fingerprint sensing module according to a second embodiment of the present disclosure.

FIG. 5 shows a second embodiment of the capacitive fingerprint sensing module. The major difference between the first embodiment and the second embodiment is that the flexible printed circuit board 41 in the latter further provides a scratch resistant layer 63. The scratch resistant layer 63 is formed on the upper conductive adhesive layer 61. In this embodiment, a top surface of the scratch resistant layer 63 is formed on the same plane with the top surface of the positioning frame 51. The scratch resistant layer 63 is used to protect the upper conductive adhesive layer 61 from being directly touched or scratched by the user's finger or other objects as well as provide an operation of being pressed on the finger pressing region 41R of the upper surface 411 by the user's finger, thus increasing use lifespan and maintaining conductive effect of the upper conductive adhesive layer 61.

The capacitive fingerprint sensing module of the present disclosure can be applied to USBs, notebook computers, mobile phones, credit cards, passports, identification cards, or so on for fingerprint identifications. In conclusion, the present disclosure has the following advantages:

1. The lower conductive adhesive layer 62 and the upper conductive adhesive layer 61 are provided to enhance conductivity of the first sensing electrodes 701 and the second sensing electrodes 702 and improve accuracy of the capacitive fingerprint sensing module; and 2. The scratch resistant layer 63 is used to protect the upper conductive adhesive layer 61 from being directly touched or scratched by the user's finger or other objects, thus increasing use lifespan and maintaining conductive effect of the upper conductive adhesive layer 61.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

The invention claimed is:

1. A capacitive fingerprint sensing module comprising:
a flexible printed circuit board comprising:
an upper surface having a finger pressing region and a first sensing layer corresponding in position to the finger pressing region, wherein a plurality of first sensing electrodes are mounted on the first sensing layer; and
a lower surface having a second sensing layer corresponding in position to the finger pressing region, wherein a plurality of second sensing electrodes are mounted on the second sensing layer;
a lower conductive adhesive layer formed on the second sensing layer of the flexible printed circuit board and configured to cover the second sensing electrodes;
an upper conductive adhesive layer formed on the finger pressing region; and
a positioning frame having an opening facing upward and a slot formed in a side wall of the positioning frame and communicating with the opening;
wherein the flexible printed circuit board is inserted through the slot and embedded in the positioning frame, and the finger pressing region of the upper surface is corresponding in position to and exposed at the opening of the positioning frame.

2. The capacitive fingerprint sensing module as claimed in claim 1, wherein a top surface of the upper conductive adhesive layer is formed on the same plane with a top surface of the positioning frame.

3. The capacitive fingerprint sensing module as claimed in claim 1, wherein the flexible printed circuit board further comprises:
a scratch resistant layer formed on the upper conductive adhesive layer.

4. The capacitive fingerprint sensing module as claimed in claim 3, wherein a top surface of the scratch resistant layer is formed on the same plane with a top surface of the positioning frame.

5. The capacitive fingerprint sensing module as claimed in claim 1, wherein the lower conductive adhesive layer is a hard conductive adhesive layer or a soft conductive adhesive layer, and the upper conductive adhesive layer is a hard conductive adhesive layer or a soft conductive adhesive layer.

6. The capacitive fingerprint sensing module as claimed in claim 2, wherein the lower conductive adhesive layer is a hard conductive adhesive layer or a soft conductive adhesive layer, and the upper conductive adhesive layer is a hard conductive adhesive layer or a soft conductive adhesive layer.

7. The capacitive fingerprint sensing module as claimed in claim 5, wherein the lower conductive adhesive layer and the upper conductive adhesive layer are anisotropic conductive adhesive layers.

8. The capacitive fingerprint sensing module as claimed in claim 6, wherein the lower conductive adhesive layer and the upper conductive adhesive layer are anisotropic conductive adhesive layers.

9. The capacitive fingerprint sensing module as claimed in claim 1, further comprising:
a control unit formed on the lower surface of the flexible printed circuit board and electrically connected to the first sensing electrodes and the second sensing electrodes via conductive traces on the flexible printed circuit board;
wherein each of the first sensing electrodes and each of the second sensing electrodes are configured to respectively receive a press sensing signal to correspondingly produce a sensing capacitance value; the control unit is configured to receive the sensing capacitance values and determine whether the first sensing electrodes and the second sensing electrodes are pressed or not according to the sensing capacitance values.

10. The capacitive fingerprint sensing module as claimed in claim 1, further comprising:
a control unit formed on the upper surface of the flexible printed circuit board and electrically connected to the first sensing electrodes and the second sensing electrodes via conductive traces on the flexible printed circuit board;
wherein each of the first sensing electrodes and each of the second sensing electrodes are configured to respectively receive a press sensing signal to correspondingly produce a sensing capacitance value; the control unit is configured to receive the sensing capacitance values and determine whether the first sensing electrodes and the second sensing electrodes are pressed or not according to the sensing capacitance values.

* * * * *